(12) United States Patent
Topmiller (10) Patent No.: US 7,310,587 B2
(45) Date of Patent: Dec. 18, 2007

(54) PROGRAMMED METHOD AND APPARATUS FOR QUADRATURE OUTPUT SENSORS

(75) Inventor: David Allen Topmiller, Fort Wright, KY (US)

(73) Assignee: Balluff, Inc., Florence, KY (US)

( * ) Notice: Subject to any disclaimer, the term of this patent is extended or adjusted under 35 U.S.C. 154(b) by 16 days.

(21) Appl. No.: 10/844,227

(22) Filed: May 12, 2004

(65) Prior Publication Data

US 2004/0208473 A1    Oct. 21, 2004

Related U.S. Application Data

(62) Division of application No. 10/167,739, filed on Jun. 12, 2002, now Pat. No. 6,757,635.

(60) Provisional application No. 60/341,060, filed on Dec. 12, 2001.

(51) Int. Cl.
*G06F 15/00* (2006.01)

(52) U.S. Cl. .................. 702/150; 702/85; 702/89

(58) Field of Classification Search .............. 702/150, 702/66, 67, 71, 75, 107, 104, 57, 85, 89, 702/198
See application file for complete search history.

(56) References Cited

U.S. PATENT DOCUMENTS

| | | | |
|---|---|---|---|
| 3,553,447 A | 1/1971 | Zimmerman et al. | |
| 3,898,555 A | 8/1975 | Tellerman | |
| 4,071,818 A | 1/1978 | Krisst | |
| 4,121,155 A | 10/1978 | Chamuel | |
| 4,144,519 A | 3/1979 | Chamuel | |
| 4,238,844 A | 12/1980 | Ueda et al. | |
| 4,319,189 A | 3/1982 | Cullum et al. | |
| 4,433,291 A | 2/1984 | Yariv et al. | |
| 4,573,139 A | 2/1986 | Bonivich | |
| 4,654,590 A | 3/1987 | Kitaura et al. | |
| 4,658,373 A | 4/1987 | Murakami et al. | |
| 4,678,993 A | 7/1987 | Vinnemann et al. | |
| 4,697,125 A | 9/1987 | Goff et al. | |
| 4,719,575 A * | 1/1988 | Gnuechtel | 700/122 |
| 4,721,902 A | 1/1988 | Tellerman et al. | |
| 4,724,525 A | 2/1988 | Purcell et al. | |

(Continued)

OTHER PUBLICATIONS

Creonics, *TEC-242 Transducer to Encoder Converter Installation and Setup Manual*, Stock No. 999-059, Mar. 3, 1989.

(Continued)

*Primary Examiner*—Bryan Bui
(74) *Attorney, Agent, or Firm*—Dinsmore & Shohl LLP (57) ABSTRACT

A sensor is provided in one illustrative embodiment that includes a microcontroller that executes a program that generates quadrature output signals that indicate the change in a parameter being measured. As an example, the sensor could comprise a linear position transducer. The quadrature output signals can comprise square wave signals that are ninety degrees out of phase, each transition of the signals representing a unit of change in position of the measured mass. According to another aspect, the quadrature signals can be placed into phase with one another to indicate an error condition. In another aspect, user inputs can be provided to allow the user to select parameters such as frequency, update rate, and/or resolution. Moreover, at least one of the sensor inputs can be utilized to load calibration factor data for the sensor.

14 Claims, 8 Drawing Sheets

U.S. PATENT DOCUMENTS

| | | | |
|---|---|---|---|
| 4,726,226 A | 2/1988 | Tellerman | |
| 4,739,186 A | 4/1988 | Crookshanks | |
| 4,746,880 A * | 5/1988 | McCune, Jr. | 332/119 |
| 4,787,058 A | 11/1988 | Schmars | |
| 4,803,427 A | 2/1989 | Mason et al. | |
| 4,831,510 A | 5/1989 | Dummermuth et al. | |
| 4,862,096 A * | 8/1989 | Spence | 327/114 |
| 4,936,143 A | 6/1990 | Schutten et al. | |
| 4,984,067 A * | 1/1991 | Cavallerano et al. | 375/240.01 |
| 4,990,058 A | 2/1991 | Eslinger | |
| 4,995,019 A | 2/1991 | Begin | |
| 5,038,305 A | 8/1991 | Kumar et al. | |
| 5,050,135 A | 9/1991 | Pai et al. | |
| 5,115,195 A | 5/1992 | Peterson et al. | |
| 5,150,049 A | 9/1992 | Schuetz | |
| 5,206,586 A | 4/1993 | Yauch | |
| 5,287,285 A | 2/1994 | Tsai | |
| 5,311,124 A | 5/1994 | Hubbard | |
| 5,334,933 A | 8/1994 | Tellerman | |
| 5,403,238 A | 4/1995 | Baxter | |
| 5,412,317 A | 5/1995 | Kyoizumi | |
| 5,416,397 A | 5/1995 | Mazzara | |
| 5,456,114 A | 10/1995 | Liu | |
| 5,473,990 A | 12/1995 | Anderson et al. | |
| 5,508,975 A | 4/1996 | Walter | |
| 5,583,844 A | 12/1996 | Wolf et al. | |
| 5,623,878 A | 4/1997 | Baxter et al. | |
| 5,717,330 A | 2/1998 | Moreau et al. | |
| 5,796,250 A | 8/1998 | Dames | |
| 5,831,432 A | 11/1998 | Mohri | |
| 6,097,183 A | 8/2000 | Goetz et al. | |
| 6,192,753 B1 | 2/2001 | Czarnek | |
| 6,192,754 B1 | 2/2001 | Czarnek | |
| 6,248,067 B1 * | 6/2001 | Causey et al. | 600/365 |
| 6,249,234 B1 | 6/2001 | Ely et al. | |
| 6,615,114 B1 * | 9/2003 | Skiba et al. | 700/275 |
| 6,897,435 B2 * | 5/2005 | Remillard et al. | 250/231.13 |

OTHER PUBLICATIONS

Temposonics R Series, *Product Specifications*, 2001.

* cited by examiner

PROGRAMMED METHOD AND APPARATUS FOR QUADRATURE OUTPUT SENSORS

CROSS-REFERENCE TO RELATED APPLICATIONS

The present application is a divisional of U.S. application Ser. No. 10/167,739 filed Jun. 12, 2002, now U.S. Pat. No. 6,757,635 which claims priority under 35 U.S.C. §119 of U.S. Provisional Application No. 60/341,060 filed Dec. 12, 2001, the entire disclosures of which are hereby incorporated herein by reference.

TECHNICAL FIELD

The present invention relates generally to linear position sensors, and, more particularly, in one embodiment, to a linear position sensor capable of providing a quadrature output signal that can comprise two square wave signals that are ninety degrees out of phase.

BACKGROUND OF THE INVENTION

Sensors are utilized to indicate the value of a measured parameter, such as position, temperature, pressure, rotation, velocity, and the like, by providing an output signal. As an example, a linear position sensor can indicate the position of a movable mass. For example, such linear position sensors can indicate the position of a movable machine element, the location of a movable piston in a cylinder, or the level of a movable liquid in a container.

A magnetostrictive linear position transducer is a type of linear position sensor where a phenomenon known as magnetostriction is utilized to determine the position of the movable mass. In particular, in one such sensor, a control circuit transmits an interrogation signal along a wire that is adjacent the length of a waveguide, the waveguide being made from a magnetostrictive material. A magnet is movable along the waveguide and is connected to or otherwise follows the movable mass. When the interrogation signal reaches the location of the magnet, a magnetostrictive effect is created in the waveguide causing a strain wave and a electromagnetic wave to be generated and to travel along the waveguide. A detector is provided near the end of the waveguide to detect when one of these waves has reached the end of the waveguide and to cause an electrical return signal to then be generated.

A circuit or processor can then compute the amount of time elapsed between the sending of the interrogation signal and the generation of the return signal. The amount of time computed is directly proportional to the distance of the magnet from the coil end of the waveguide. The speed at which the magnetostrictive wave will travel along the waveguide is known (and is a function of the material of the waveguide). Accordingly, multiplying the time computed by the known magnetostrictive speed constant will result in the distance of the magnet along the waveguide. The distance can then be provided as an absolute value in an analog or digital format to a control device, such as to a programmable controller or the like.

However, certain control systems are configured to be used with sensors that provide incremental signals, such as quadrature signals for example. A linear encoder is one sensor device that typically provides a quadrature output signal which indicates the change in position of the movable element, rather than the absolute position of that element. In particular, such a device can provide a pair of square wave signals which are approximately ninety degrees out of phase. Each rising and falling edge of these two square wave signals represents an increase or decrease in position. The quadrature signals are provided to a control system, and a counter in the control system can keep a running tally of the increases and decreases, so that it continually has knowledge of the position of the movable element. The counter can increase or decrease the count according to the rising and falling edges of the two signals (the A and B signals). Whether the A signal leads or lags the B signal indicates whether the position is increasing or decreasing and whether the counter should increase or decrease its count. Using the position count, the control system can then control the process or machine at hand.

While many magnetostrictive position sensors provide digital or analog output signals, it is desirable to provide a magnetostrictive position sensor that provides a quadrature output such that it can be utilized with those control devices and control systems that require such signal formats as inputs. In particular, it is desirable to provide such a quadrature output sensor and other quadrature output devices that are accurate, that are low in cost, that provide selectable or programmable features, that minimize control circuit components, that indicate when errors have occurred, that provide an output representing a recent measurement, that account for waveguide variance, and/or that are easily modified as desired. Moreover, it is desirable to provide a quadrature output linear position sensors and other sensors that are easily calibrated.

SUMMARY OF THE INVENTION

At least one embodiment of the present invention provides an improved quadrature output sensor.

Furthermore, at least one embodiment of the present invention provides a quadrature output sensor that is accurate, low in cost, provides selectable features, minimizes control circuit components, can indicate when errors have occurred, provides an output representing a recent measurement, accounts for waveguide variance, is easily modified as desired, and/or is easily calibrated.

In particular, a linear position sensor is provided comprising a magnetostrictive waveguide, a signal detector configured to generate a return signal from a magnetostrictive response of the waveguide, and a control module configured to provide a position output signal in response to the time delay between the interrogation and return signals. In addition, the sensor comprises a microcontroller in communication with the control module, and a program configured to be executed by the microcontroller. The program is adapted to determine a number of quadrature pulses to be provided in response to the change of the position output signal and to generate that number of quadrature pulses at two outputs of the controller by providing approximate square wave signals at those outputs. The square waves provided at the outputs are approximately ninety degrees out of phase from one another.

In addition, a method in a sensor is provided for generating incremental output signals indicating the change in a parameter. The method comprises providing a signal representing the value of the parameter, and using a program to determine a number of transitions to provide based upon the change in the value of the parameter. The method further comprises using the program to switch at least one incremental output signal based upon the number of transitions determined, such that the number of transitions in the incremental output signal represents the change in parameter.

Moreover, a programmed method in a sensor is provided for generating quadrature output signals indicating the change in a measured parameter. The method comprises determining a transition count based upon the change in the measured parameter, and determining the direction of the change in the parameter. The method further comprises generating a pair of quadrature pulse signals such that the number of transitions in the quadrature pulse signals is substantially equal to the transition count, and such that the phase of the pulse signals is offset based upon the direction determined.

In addition, a method is provided for providing output signals in a quadrature output device. The method comprises providing a measurement signal indicating the value of a measured parameter, and generating a pair of signals having a number of transitions, the number of transitions in the signals having a relation to the measurement signal. The method further comprises detecting whether an error has occurred, and, if an error has occurred, causing a simultaneous transition of the pair of signals.

Furthermore, a method for providing output signals from a sensor is provided. The method comprises receiving at least one input from a user indicating a user selection, modifying a program setting based upon the user selection, and determining the value of a measurement parameter. The method uses the program to generate a pair of signals having a number of transitions, the number of transitions in the signals having a relation to the measured parameter.

Moreover, a method for calibrating a sensor is provided. The method comprises testing the sensor to determine calibration factor data, and connecting a calibration device to at least one sensor input that is normally used to receive a command signal from an external control device. The method also comprises loading calibration factor data from the calibration device over the at least one sensor input.

Furthermore, a method is provided for producing a quadrature output from a position transducer having a magnetostrictive waveguide. The method comprises determining a time to produce an interrogation signal such that a response signal will be received from the waveguide prior to the receipt of a strobe signal from a control device. The method further comprises generating an interrogation signal at the determined time, and receiving a response signal, wherein the time difference between the interrogation signal and the response signal is proportional to the measured position. The method further comprises receiving a strobe signal from a control device, and, in response to the strobe signal, generating a quadrature output signal based upon the time difference such that the quadrature output signal represents the change in the measured position.

Still other advantages and aspects of the present invention will become apparent to those skilled in this art from the following description wherein there is shown and described details of illustrative embodiments simply for the purposes of illustration and for describing currently contemplated best modes. As will be realized, other variations and embodiments can be provided without departing from the scope of a given claim, and particular aspects, details, embodiments, principles, and advantages mentioned should not be viewed as restricting a given claim. Accordingly, the drawings and descriptions are to be regarded as illustrative in nature and not restrictive in nature.

BRIEF DESCRIPTION OF THE DRAWINGS

The illustrative embodiments will be understood from the following description taken in conjunction with the accompanying drawings in which.

DETAILED DESCRIPTION OF ILLUSTRATIVE EMBODIMENTS

In general, a sensor (e.g., a transducer, gauge, or detector) is provided in one embodiment that includes a microcontroller that executes a program that generates quadrature output signals that indicate the change in a parameter being measured. As an example, the sensor could comprise a linear position transducer. The quadrature output signals can comprise square wave signals that are ninety degrees out of phase, each transition of the signals representing a unit of change in position of the mass. The quadrature signals can be generated by the program periodically or upon command from an external control device. According to another aspect, the quadrature signals can be placed into phase with one another to indicate an error condition. In accordance with another aspect, user inputs can be provided to allow the user to select parameters such as frequency, update rate, and/or resolution. Moreover, at least one of the sensor inputs can be utilized to load calibration factor data for the sensor. Furthermore, an interrogation of the waveguide can be made at an optimal time such that the quadrature output signals provided upon request from a control device are from a very recent measurement.

Figure 1:
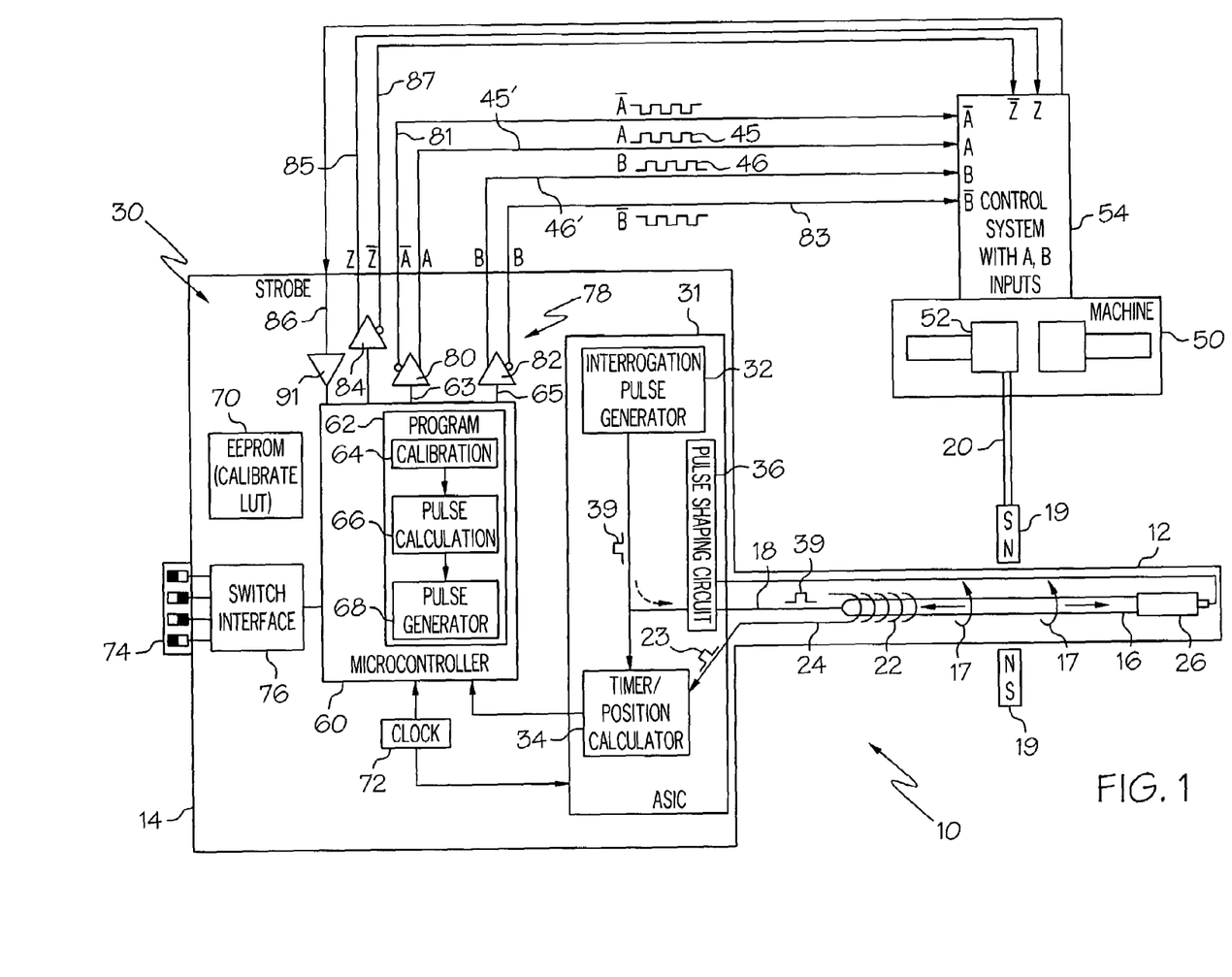
FIG. 1 is a schematic diagram showing an illustrative embodiment of a quadrature output magnetostrictive position sensor, made according to at least one aspect of the present invention, and its connection to a control system having quadrature inputs.

FIG. 1 depicts an illustrative linear position sensor having an incremental (e.g., quadrature) output and made in accordance with the principles of the present invention. The linear position sensor 10 includes a waveguide housing 12 and an electronics housing 14. While such linear position sensors 10 can take any of a variety of forms and structural combinations, illustrative structures will be discussed for purposes of general illustration and understanding of principles of the present invention. Such illustrative structures are disclosed in U.S. Pat. No. 6,232,769, the entire disclosure of which is hereby incorporated herein by reference.

The shape of the housing 12 in FIG. 1 can depend upon the application of the sensor 10. For example, a rod-style or cylindrical housing could be utilized for insertion into hydraulic cylinders, and a generally rectangular-shaped housing might be utilized for applications having moving components external to cylinders. Provided within the waveguide housing 12 is a magnetostrictive waveguide 16, which can be in the form of an elongated wire, rod, or bar, or can be tubular in shape. The waveguide 16 is generally made from a magnetic material which has the ability to deform in proportion to the strength of an applied magnetic field, and is therefore considered "magnetostrictive." Examples of such materials include iron, nickel, and iron-nickel alloys. The waveguide 16 can include an opening which extends longitudinally through its center.

In this illustrative embodiment, a conductor 18 runs from electronics 30 in the electronics housing 14, and through the length of the opening within the tubular waveguide 16. The conductor 18 then runs back to the electronics 30 on the exterior of the waveguide 16. Alternatively, the waveguide 16 could comprise a solid wire or rod of conductive material. In such a case two conductors 18 could be provided to connect the two ends of the solid waveguide 16 to the appropriate electronics.

At one end of the waveguide 16 is a pickup coil 22 which has a portion which effectively surrounds an end portion of the waveguide. Other suitable signal detectors could be utilized as alternatives to the coil 22.

Surrounding or connected to the opposite end of the waveguide 16 is a damper 26, which can be made of a silicone, rubber or other material which can absorb mechanical waves to minimize interference from wave reflections. The damper 26 can be utilized if it is desired to prevent reflected waves from possibly interfering with future measurements.

A magnet 19 is movable about the exterior of the waveguide housing 12. The magnet 19 can have a round shape with a center opening (e.g., a donut-like shape) for engaging the housing 12. The magnet 19 could take on other shapes and configurations as well. For example, the magnet 19 could have a flat, rectangular shape to slidingly engage one side of the housing 12, such as through the engagement of a groove or track on the housing 12. As another alternative, the magnet 19 could comprise an existing movable part of a machine, such as a magnetic piston head within a cylinder of a machine, or could comprise a plurality of magnets spaced around the waveguide.

In the illustrative embodiment of FIG. 1, the magnet 19 is mechanically connected, via control arm 20, to a movable mass, which in this case is a movable element 52 within a machine 50. For example, the movable element 52 could comprise a movable face on a hydraulic press or a movable spindle on a spindle press. Because of the linkage 20 between the movable element 52 and the magnet 19, movement of the element 52 results in corresponding movement of the magnet 19. Other applications are contemplated as well, such as for example, placing the housing 12 in a vertical position, and providing a float on the magnet 19 to allow the sensor to indicate the level of a fluid in a container. An external control system 54 is provided to receive "A quad B" output pulses 45 and 46 from the sensor 10, and to control operation of the machine 50 based, at least in part, on these pulses. In this example, a rising or falling edge of either one of the two signals 45 and 46 represents a change in the position of the magnet 19.

The electronics 30 within the electronics housing 14 control the operation of the sensor 10. The electronics 30 and housing 14 can be located in proximity to the waveguide housing 12, or in a remote location, as needed by the application. Also, a separate housing need not be provided for the electronics 30.

The electronics 30 can include a control module 31 for generating the interrogation signals, receiving return signals, and providing a signal indicative of the position of the magnet 19 and thus the machine element 52. The control module 31 can comprise any suitable circuitry, logic arrangement, software, firmware, controller, processor, or the like. For example, the control module 31 could comprise an application specific integrated circuit.

More specifically, the control module 31 can include a pulse generator circuit or controller 32 that provides an interrogation pulse signal 39 of electrical current through the conductor 18. (As an alternative, the control device 54 can include a pulse generator to provide the interrogation pulse signal 39 through the conductor 18, in which case the pulse generator 32 would not be needed.) If necessary or desirable, the pulse 39 can be fed from the pulse generator 32 and through a pulse shaping circuit 36 prior to being fed through the conductor 18. The pulse shaping circuit 36 can provide any needed or desired shaping of the pulse 39, such as amplification for example, to ensure that the pulse 39 is of the proper amplitude and duration to produce a detectable magnetostrictive effect in the waveguide 16. This pulse 39 generates a circular electromagnetic field which rotates around the waveguide 16. When the electromagnetic field intersects with the magnetic field of the magnet 19, a magnetostrictive effect is created, causing deformation of the waveguide 16. The deformation travels or propagates along the waveguide 16 in both directions from the point of the magnet 19 and an electromagnetic wave 17 follows the deformation. The propagation velocity, or gradient, of the wave 17 along the waveguide 16 is usually about 2830 meters per second (m/s) for waveguide materials typically used in such sensors.

The mechanical deformation which reaches the distal end of the waveguide 16 can be damped by the damping material 26, to prevent it from reflecting and possibly interfering with future measurements. On the proximal end of the waveguide 16, the wave 17 passes by the coil 22, where it is converted to an electrical signal. This conversion results in an electrical return signal 23 being produced at the terminals of the coil 22.

As known in the art, the travel time of the wave 17 from the magnet 19 to the coil 22 is directly proportional to the distance of the magnet from the coil. In particular, the following equation can be used which relates the position of the magnet 19 to the travel time:

$$D = v * t,$$

where D is the distance between the coil 22 and the magnet 19, t is the time it takes for the wave 17 to travel from the magnet 19 to the coil 22, and v is the propagation velocity of the waveguide 16.

Accordingly, knowing the propagation velocity v and the time t, the distance of the magnetic marker 19 can be determined. Subsequently, the position of the movable mass 52 is known. Because the initiation of the wave 17 at the magnet 19 is nearly instantaneous with initiation of the current pulse 39, and because the reception of the wave 17 at the coil 22 is nearly instantaneous with the generation of the return pulse 23, the time t can be closely approximated by measuring the time between the generation of the current pulse 39 and the receipt of the return pulse 23, such as by methods known in the art or by other appropriate methods. Thus, if the propagation velocity v and time t are known, the distance D can be calculated (or otherwise represented by the time t). As shown in the embodiment of FIG. 1, a timer and position calculation circuit or function 34 can be provided to measure the time t and to make the calculation of the distance D, and to provide the distance as a position signal indicative of the absolute position of the magnetic marker. (This absolute position can be relative to the coil, or relative to a "null" or "start of stroke" position a small distance from the coil. The magnet can be restrained from moving from this null position toward the coil, to prevent adverse effects. Accordingly, knowing the location of the null position, the position signal generated can be converted to provide a zero output when the magnet is at that position, such as by subtracting the distance between the coil and the null position from the position signal).

The electronic circuitry 30 of this embodiment also includes a microcontroller 60 for converting the calculated position from the control module 31 to the A and B output pulse signals 45 and 46. The microcontroller can comprise any suitable controller, processor, or programmable device capable of executing a program in the form of a set of executable instructions, code, software, or firmware stored in memory. For example, a general purpose programmable microcontroller, such as a PIC microcontroller, can be utilized. Such microcontrollers can be programmed as desired to carry out the desired operations.

For example, the microcontroller 60 can include a program 62 fixed in memory of the controller for creating the quadrature output signals on lines 63 and 65. Alternatively, the program 62 could be located external to the microcontroller 60, such as in a memory unit, such as ROM memory for instance.

The program 62 switches the output signals on lines 63 and 65 between high and low values according to the number of transitions required to indicate the most recent change in position. These outputs are kept out of phase from one another, such as by switching the signals on lines 63 and 65 at different times. For example, if a signal on line 63 is to be switched to a high state and then kept there for four cycles and then switched to a low state, the program 62 could wait until the end of the first cycle to switch the other signal on line 65 to the high state. Likewise, the program 62 could wait one additional cycle after the end of a fourth cycle to switch the signal on line 65 to the low state.

More specifically, the program 62 in this embodiment includes a calibration portion or module 64, a pulse calculation module 66, and a pulse generation module 68. The calibration module 64 can be utilized to modify the position signal received from the position calculator 34, if desired, so as to account for any non-linearities or other anomalies in the waveguide 18 or other component. Exemplary methods for calibrating the signal in this manner are disclosed in U.S. Ser. No. 09/399,644, the entire disclosure of which is hereby incorporated herein by reference. An EEPROM 70, or other memory location can be utilized to store calibration factor data or lookup tables for implementing the calibration of the position signal.

The program 62 further includes a pulse calculation module 66 for determining the number of pulses necessary to indicate the change in the position signal. This can be accomplished by comparing the current position signal from control module 31 to a previously stored position signal which corresponds to the position that was received the last time updated outputs were provided on lines 63 and 65. The program 62 can make the comparison to determine the change in position, or the control module 31 could make the comparison. The number of pulses calculated by the pulse calculation module 66 is directly proportional to the change in position and is determined by the resolution to be achieved. For example, if the change in position was 10 centimeters and the resolution is 50 pulses per centimeter, then 500 pulses would need to be provided.

The final module 68 of the program 62 utilizes the pulse number calculation to generate pulses on lines 63 and 65. In particular, this pulse generation module 68 provides a number of pulses (i.e., signal transitions) on lines 63 and 65 equal to the number of pulses calculated by module 66. The module 68 will also control the offset of the pulses so provided. In particular, the module 68 will ensure that the output on line 63 reaches a high state before the output on line 65 if the change in position is determined to be in a positive direction, and the module 68 will ensure the opposite if the change in position is determined to be in a negative direction. By utilizing a program 62 in this embodiment to generate the quadrature signals, separate hardware components are not needed for performing various functions in generating the signals. Also, the program may be easily modified with additional or alternative features as desired.

Other circuitry can also be provided if desired or appropriate. For instance a clock unit 72 can be provided to generate clock signals for running the microcontroller 60 and the control module 31. Likewise, user input devices such as switches 74 can be provided and interfaced to the controller 60 via any suitable interface circuitry 76, such as serial to parallel converter circuitry for example. The user inputs 74 can allow the user to configure certain parameters that will be utilized by the controller 60 in implementing the program 62, such as the frequency of the pulses, the resolution of the pulses, and/or the frequency of the generation of the pulses.

For example, if eight switches are utilized, the switches could indicate the following modes and parameters.

|  | 1 | 2 | 3 | 4 | 5 | 6 | 7 | 8 |
|---|---|---|---|---|---|---|---|---|
| Free-running mode, 1 ms update rate | Off | Off | X | X | X | X | X | X |
| Free-running mode, 2 ms update rate | Off | On | X | X | X | X | X | X |
| Free-running mode, 4 ms update rate | On | Off | X | X | X | X | X | X |

-continued

|  | 1 | 2 | 3 | 4 | 5 | 6 | 7 | 8 |
|---|---|---|---|---|---|---|---|---|
| Synchronous mode | On | On | X | X | X | X | X | X |
| A, B = 813 kHz (3.33 MHz in quadrature) | X | X | Off | Off | X | X | X | X |
| A, B = 416 kHz (1.66 MHz in quadrature) | X | X | Off | On | X | X | X | X |
| A, B = 208 kHz (833 kHz in quadrature) | X | X | On | Off | X | X | X | X |
| A, B = 10 kHz (40 kHz in quadrature) | X | X | On | On | X | X | X | X |
| 1 micrometer resolution | X | X | X | X | Off | Off | Off | X |
| 2 micrometer resolution | X | X | X | X | Off | Off | On | X |
| 5 micrometer resolution | X | X | X | X | Off | On | Off | X |
| 10 micrometer resolution | X | X | X | X | Off | On | On | X |
| 0.0001 inch resolution | X | X | X | X | On | Off | Off | X |
| 0.001 inch resolution | X | X | X | X | On | Off | On | X |

The free running mode listed above means that the sensor 10 will operate by periodically providing the quadrature outputs, while the synchronous mode means that the sensor will provide those outputs upon request from the external control device 54. The other switches allow the user to set the frequency of the signals or the resolution of these signals. As discussed above, the frequency of the signals can be used to control the amount of delay inserted by the program 62 between signal transitions. The eighth switch can be reserved for other user selectable features. Also, combinations of Switches 5, 6, and 7 that are not defined by the table can be reserved for future use. The switches can be read by the controller 60 at power up.

In addition, the quadrature outputs on lines 63 and 65 could be provided to interface circuitry 78 if desired for providing the signals in the desired format and at the desired levels. In particular, the interface circuitry 78 could comprise a pair of RS422 drivers 80 and 82, each of which provides the original pulse signal received but also provides a complementary signal for that original pulse signal received. Thus, the driver 80 receives the first quadrature signal on line 63 and provides it as an A signal 45 on line 45', but also provides the complement of that A signal on line 81. Likewise, the driver 82 receives the quadrature signal on line 65 and provides it as a B signal 46 on line 46', but also provides the complement of that B signal on line 83. By using such a signaling scheme and providing similar RS422 receivers in the control system 54, noise introduced in the signal can be often be distinguished from the actual signal more easily.

Finally, the circuit 30 can include a strobe input on line 86 which is provided through appropriate interface circuitry 91, such as a level translator 91 for example, to the microcontroller 60. Such an input (e.g., pin, connection, receiver, line or the like) can be provided to receive command signals or requests from the control device 54. More specifically, a particular signal on the input 86 could represent a request to the controller 60 for it to generate an updated group of A and B pulses to indicate the most recent change in position. Such a signal could be provided periodically from the control system 54, such that it synchronizes the quadrature signals provided with its needs. Another type of signal provided on the input 86 could indicate that the microcontroller 60 is to provide a group of pulses on the A and B outputs which indicate the absolute position rather than change in position. In this case, the microcontroller 60 would operate the program in a slightly different manner—rather than using the change in position to determine the pulse (i.e. transition) count to be provided, it would use the absolute position received from the control module 31. Thus, the control circuitry 30 can provide an incremental or an absolute indication of position, as desired. A third signal on the input 86 could be used for other purposes, such as to program a parameter of the microcontroller 60. For example, if this signal is provided, the microcontroller 60 could save the current position of the magnet 19 and use this as a marker location. Then, whenever that marker location is reached again by the magnet 19 (as determined by comparing the marker location to the position determined), a Z signal, such as a pulse, could be provided by the program 62 on output 85 via interface 84 (The complement of the signal could be provided as well, such as via output 87 of interface 84). This signal could indicate to the control system 54 to use the marker position and to then reset its counter; subsequent pulses received on the quadrature inputs of the control system can be counted and then added or subtracted from that marker position. The marker location could be initially set to a null or zero location until programmed otherwise by the user. Alternatively, the marker location could be programmed to a set position such that it cannot be modified by the user.

The command signals provided at the input 86 could be provided in various formats to distinguish the request being made. In particular, the length of time at which the input is held active could indicate what request is being made. For example, making the signal active for a first period of time (e.g. 5 microseconds to 500 microseconds) could indicate a synchronization request for incremental output at lines A and B, and the most recent quadrature data could be sent out on the rising (e.g., active to inactive) edge of this input.

As a second example, a request for an absolute output could be made by making the signal on input 86 active for a second period of time (e.g. at least 100 milliseconds but no more than 1000 milliseconds). In particular, after 30 milliseconds of the signal being activated, the sensor 10 could then cease updating the A and B outputs and freeze them in their current state. Then, the rising (active to inactive) edge of the strobe input signal on line 86 could cause the absolute position of magnet 19 (e.g. relative to the null position) to be provided as a group of pulses on the A and B outputs, without affecting the Z output. If the input signal on the input 86 is activated for less than 100 milliseconds (but greater than 500 microseconds), then the sensor 10 could return to normal operation after the input is deactivated. After providing the absolute position, the transducer 10 could return to normal operating mode.

The third illustrative type of request can be for storing the marker position. For this request, the input 86 could be held active from 1 second to 5 seconds. The rising (active to inactive) edge of the signal could then cause the current position of the magnet marker 19 to be stored by the microcontroller 60. In this example, after the input 86 is held active for 30 milliseconds, the outputs can be frozen, as discussed above, and if the input is held active for more than 5 seconds, the sensor 10 returns to normal operation. To prevent the inadvertent overwriting of the Z position, the strobe input signal on line 86 could be ignored during sensor power-on until it goes inactive.

Although illustrative command inputs have been discussed above, other alternative or additional requests and commands can be provided to the microcontroller in any of a variety of formats. These requests can be made by the control system 54 or by another programming, data acquisition, or control device.

Figure 2A:
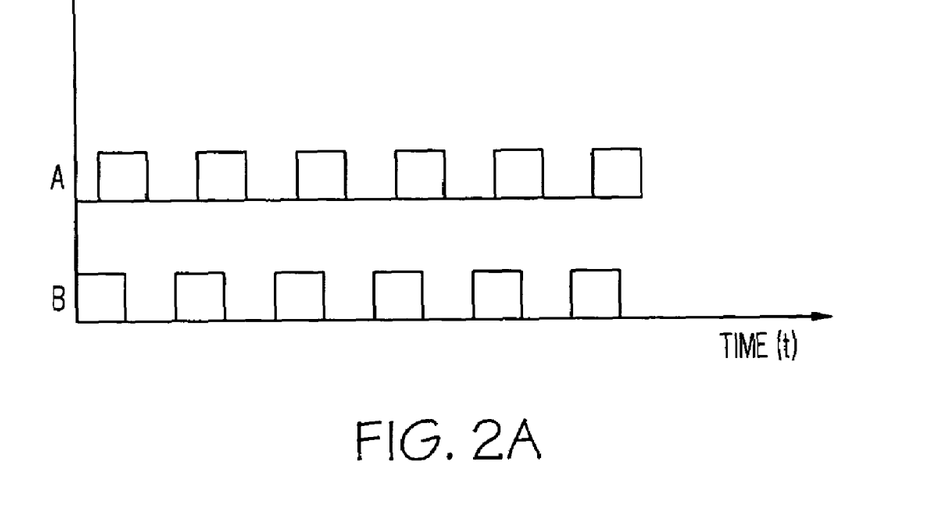
FIGS. 2a and 2b are graphs depicting illustrative A and B quadrature output signals that may be generated by the exemplary embodiment of FIG. 1.
Figure 2B:
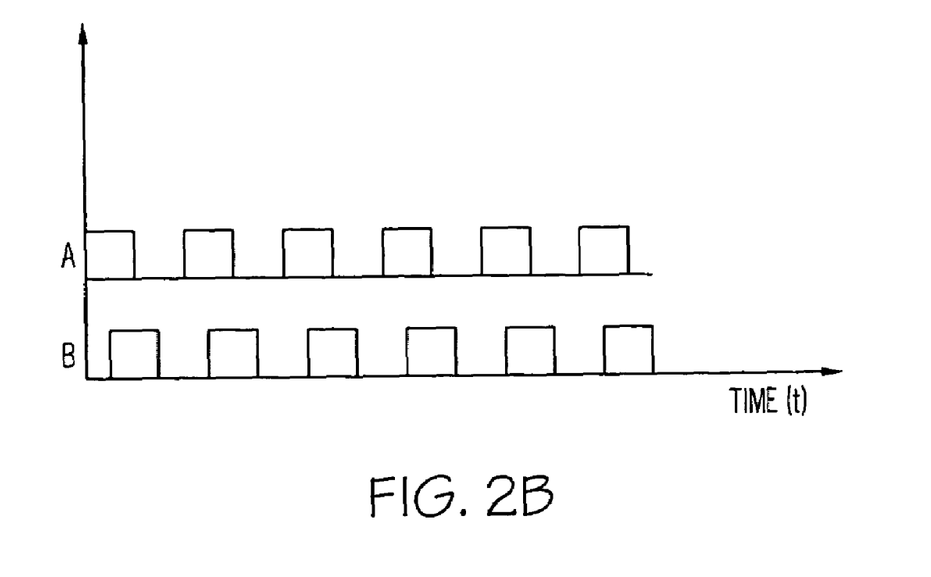

FIGS. 2a and 2b illustrate quadrature signals that can be generated by a sensor configured as such. As shown in FIGS. 2a and 2b, signal A is typically a square wave alternating between the logical level 0 and the logical level 1, while signal B mimics A but either lags or leads A by 90 degrees, depending upon the direction of movement of the parameter being measured. For example, the phase relationship of B leading A, shown in FIG. 2a, could represent a decrease in the measured position, and the phase relationship of A leading B, shown in FIG. 2b, could represent an increase in the measured position. Each transition of the A or B square wave from high to low or low to high represents one incremental movement in the measured position. The A and B output signals are delivered to a control device or control system, which may include a bidirectional counter and/or associated software to keep a running count of the output pulses. The count is increased when the measured position moves in the positive direction, as indicated by the phase relationship of the A and B signals, and the count is decreased when the measured position moves in a negative direction. After determining the count (which represents the measured position), the control system can then regulate the machine or process as it normally would.

Figure 3:
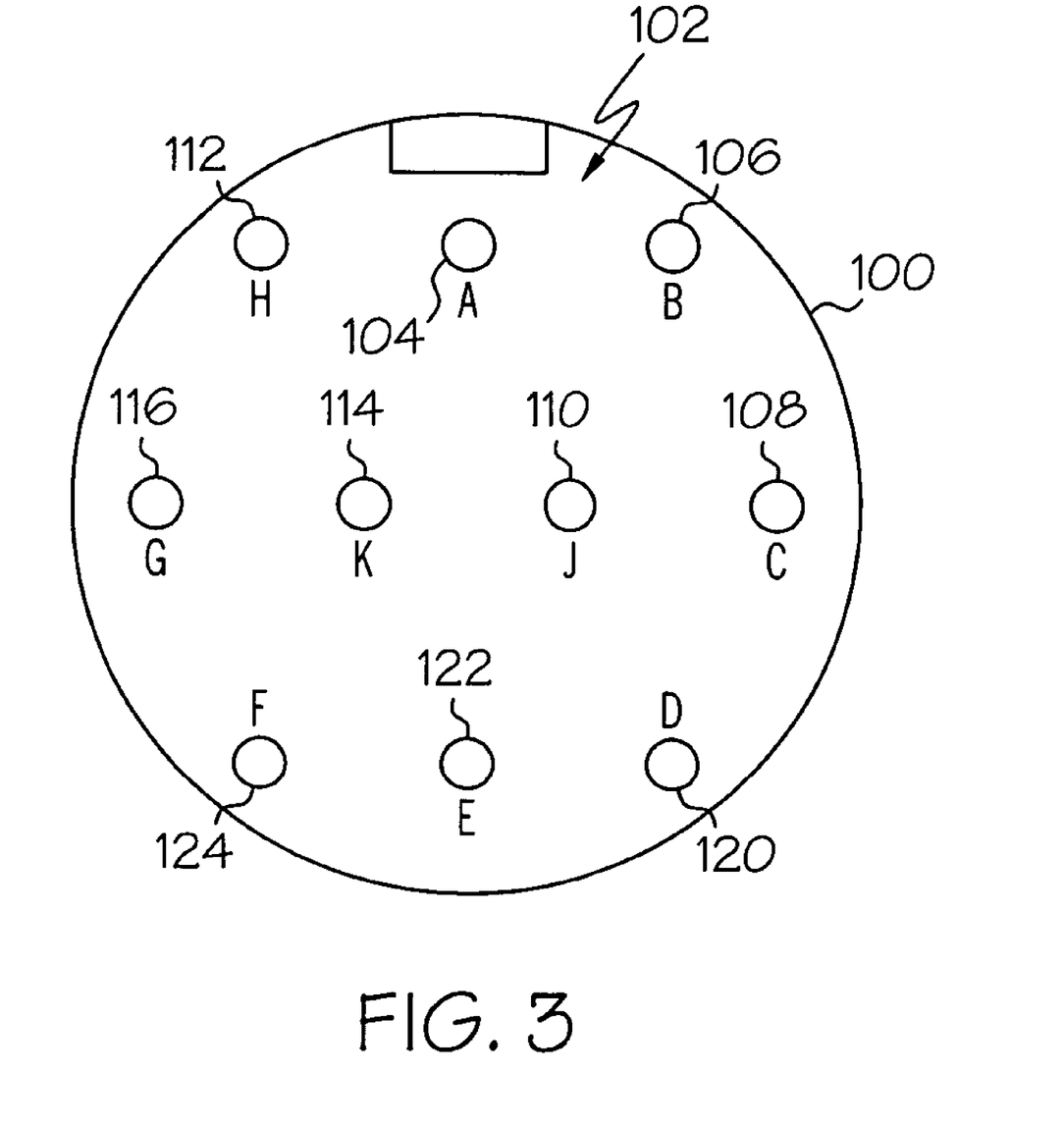
FIG. 3 is a schematic view of an illustrative connector which can be used for providing quadrature output signals from a sensor, such as that of FIG. 1 for instance.

FIG. 3 depicts an illustrative connector 100 that could be utilized to provide the quadrature outputs discussed herein. In particular, the connector 100 includes a plurality of inputs and outputs in the form of pins 102 that are utilized to receive and provide the signals desired. In particular, output pins 104 and 106 provide the quadrature A and B signals, while output pins 110 and 108 respectively provide the complement of the A and B signals. Output pin 112 provides the Z output discussed above (if it is desired to also provide a marker signal or pulse each time a particular predetermined position is reached), and output pin 114 provides the complement of the Z signal. Moreover, input pin 116 provides an input for receiving commands or requests, such as those discussed above for example. Finally, power signals can be supplied on pins 120 and 122 (e.g., +24/15 volts and −15 volts respectively) and pin 124 can be connected to ground. Other arrangements, numbers of inputs and outputs, and connectors could be utilized as alternatives to the illustrative connector of FIG. 3.

Figure 4:
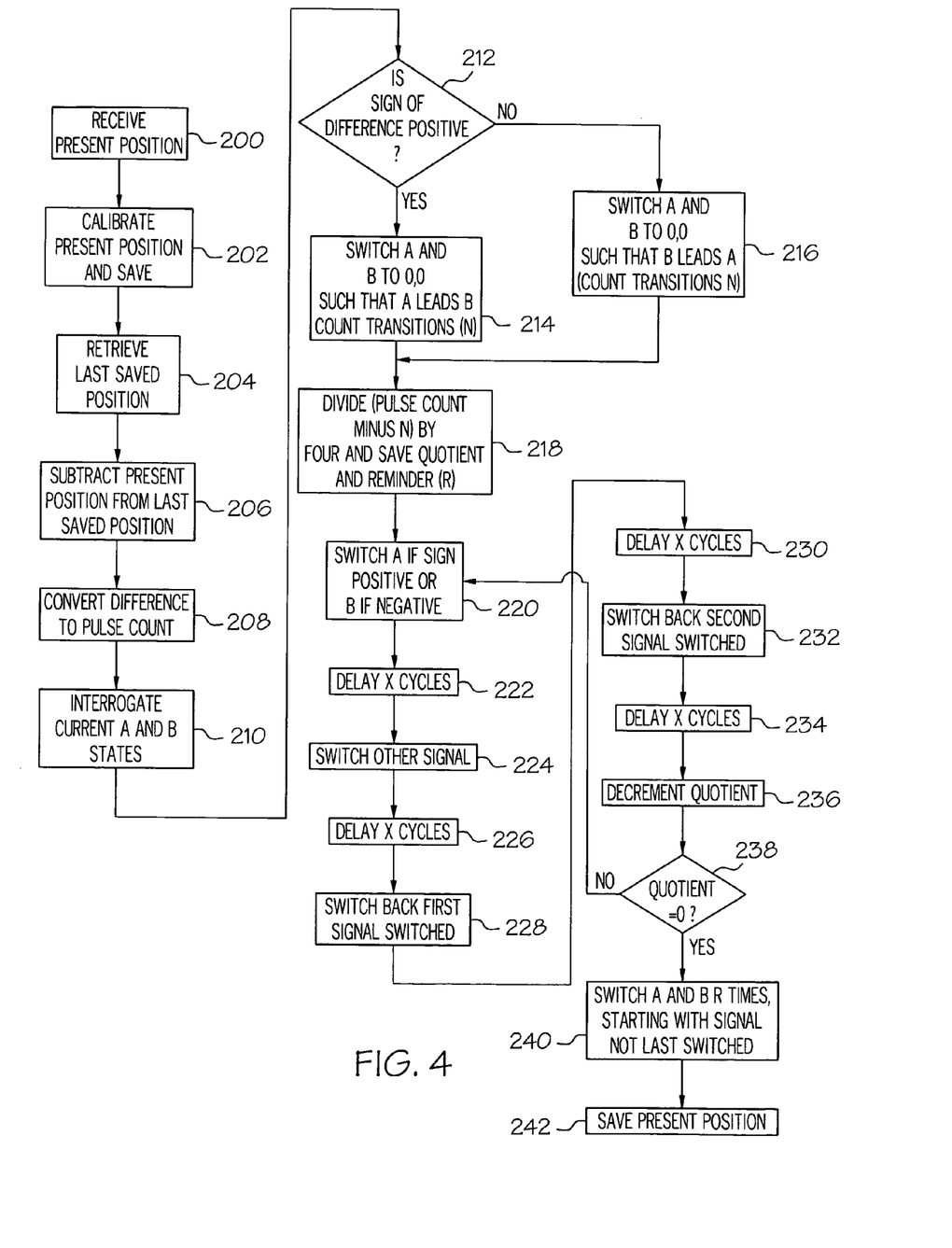
FIG. 4 is a flow diagram depicting an illustrative programmed method for generating quadrature output signals from a sensor, in accordance with at least one aspect of the present invention.

FIG. 4 is a flow diagram depicting an illustrative programmed method for generating quadrature output signals from a sensor. This program can be implemented in a set of executable instructions, in code, in software, or in firmware, for example. In particular, in this example, the present position that has been measured is received at block 200. This position measurement can be represented in units of position or in corresponding units of time. If desired, this position value can be calibrated using calibration factor data to account for any non-linearity in components, as shown at block 202. Then, the last position measurement that was saved is retrieved, as shown at block 204. The present position is then subtracted from the last saved position measurement, as shown at block 206, so as to determine the change in the position measurement. The difference can then be converted to a pulse count as shown at block 208, such as by multiplying the resolution by the difference calculated. At block 210, the current states of the A and B outputs are then interrogated or polled. These outputs have been frozen in their current position since the last time quadrature output signals were provided. In the example of FIG. 1, this interrogation process could be achieved by interrogating the status of lines 63 and 65.

Then, knowing the current status of the quadrature outputs, it can be determined how to get these signals to some predefined state (such as a state in which they are both low), but not at the same time and in an order that would be consistent with the direction (sign) of the change in position. This is because the order of the transitions of these signals will indicate to the control device that receives the signals the direction (sign) of the change in position (i.e., whether there was movement in a positive or a negative direction). Thus, the illustrative programmed method places those quadrature outputs into that predefined state, but it does so by switching them in an order that would correspond with the direction (sign) of the change in position that was calculated in block 206. In particular, the sign of the change in position is analyzed at decision block 212. If the sign is positive, then A and B go through any needed transitions to get both signals to the predefined state (in this case, the low state) such that A leads B. Various subroutines can be executed depending on the status of the A and B signals. For instance if A and B are both in the high state and the sign is positive, then A would lead B by switching A to a low state, waiting a time delay and then switching B to the low state. The number N of these transitions would be counted or noted and would equal two in this example. As another example, if A is in the high state and B is in the low state, and the sign is positive, then B could be switched to the high state, a delay would occur, then A would be switched to the low state, a delay would occur, and B would be switched to the low state. The number N of these transitions would be counted or noted and would equal three in this example. If A is in the low state and B is in the high state and the sign was positive, then one transition would be made; B would be switched to the low state and the number N of transitions would equal one. Finally, if A and B are already both in the low state, no transitions would be made and N would be zero. This switching of A and B to a predefined state in the event of a positive change in direction is shown at block 214.

Opposite switching would occur in this example, if the sign of the change in position was determined to be negative. For instance if A and B are both in the high state and the sign is negative, then B would lead A by switching B to a low state, waiting a time delay and then switching A to the low state. The number N of these transitions would be counted or noted and would equal two in this example. As another example, if B is in the high state and A is in the low state, and the sign is positive, then A could be switched to the high state, a delay would occur, then B would be switched to the low state, a delay would occur, and A would be switched to the low state. The number N of these transitions would be counted or noted and would equal three in this example. If B is in the low state and A is in the high state and the sign was negative, then one transition would be made; A would be switched to the low state and the number N of transitions would equal one. Finally, if A and B are already both in the low state, no transitions would be made and N would be zero. This switching of A and B to a predefined state in the event of a negative change in position measured is shown at block 216.

After this initialization to a predefined state, a loop can be executed to continue creating some or all of any additional pulses needed to reach the pulse count. In particular, as shown at block 218, the number N of initialization transitions is subtracted from the pulse count and the difference is divided by four. The quotient and remainder from this division process are then saved. Then, the loop is entered and executed a number of times equal to the quotient. The A signal is then switched at block 220 if the change in position was positive, or the B signal is switched at block 220 if the change in position was negative. A delay is then executed at block 222. The amount of time or number of cycles that are implemented by the delay can be set to a base number X, such as by the user inputs. This number X can represent an amount of time or a number of clock cycles (and therefore a set amount of time). This delay will affect the frequency of the signals produced. Such delays described herein can be achieved by a program in a number of ways. For example, in Assembly language a No-ops (no operations) command could be utilized indicating that nothing is to be changed during the delay. Loops, routines, counters, timers, and the like could be utilized as alternatives, if they can achieve the timing desired. After the delay, the other signal is switched as shown at block 224 (i.e. A is switched if B was switched at block 220, or B is switched if A was switched at block 220). Then, another delay is introduced at block 226, so as to introduce a ninety degree phase shift. If other shifts are desired, then this delay could be set to another number; for instance, two times the value X could be utilized. Then, the first signal that was switched (i.e., the leading signal) is switched back to its original state, as shown at block 228. A delay of amount X is then introduced and the second signal (the lagging signal) is switched back, as shown at blocks 230 and 232. Another delay of X is then executed, as shown at block 234.

The quotient is then decrement and compared to zero, as shown at blocks 236 and 238. If the quotient has not reached zero, then the loop is repeated by returning the process to block 220. However, if the quotient has reached zero, then the process continues to block 240, where A and B are alternately switched a number of times equal to the remainder R (calculated in block 218). The switching starts with the signal not last switched. Delays are introduced between the switchings, so as to achieve the ninety degree phase relationship. The present position (that was received at block 200) is saved at block 242, for future use in determining the change of position.

Many other additions and alternatives to this illustrative programmed method of FIG. 4 are possible. Moreover, operations can be executed by one or more microcontrollers working in conjunction. As an example, with respect to the embodiment of FIG. 1, the control module 31 could provide a pre-calibrated change in position signal to the microcontroller rather than an uncalibrated position signal. Furthermore, the position determination steps of the control module 31 and the quadrature generation steps of the microcontroller 60 could be combined and executed by a single microcontroller.

The embodiments described herein utilizing a program or software for generating the quadrature output signals from the position sensor can provide advantages in terms of accuracy, flexibility, cost, and/or number of components needed.

Figure 5:
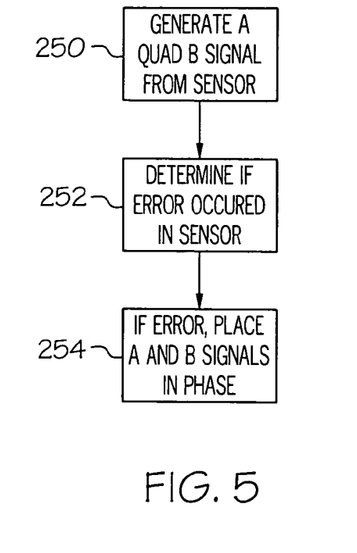
FIG. 5 is a flow diagram of an illustrative error detection method of operation that can be conducted by a program in a sensor that creates quadrature signals, according to at least one aspect of the present invention.

Other features and flexibility can be provided by such programs which allow for the generation of quadrature output signals from sensors. For instance, FIG. 5 depicts an illustrative method of operation that can be conducted by a program that creates quadrature signals. In particular, at block 250, the quadrature A and B signals are generated, such as, for example, by switching outputs of a programmed microcontroller in accordance with methods described above. It is then determined at block 252 whether an error has occurred in the sensor. Errors that may be present include out-of-range or missing measurements of the measured parameter, improperly operating components and the like. It can be desirable in some instances to detect such errors. For example, in the case of a linear position transducer used in a closed loop system, if the transducer is not producing a position signal because the magnet has been removed or is damaged, the control system could needlessly and continually increase the amplitude of the output signals provided to machine elements resulting in the risk of damage to the machine. Accordingly, it can be desirable to indicate whether such an error has occurred, so that the control system does not attempt to operate in such an uncontrolled manner. In particular, with respect to block 254, if an error signal is detected, the quadrature A and B signals are continually switched between the same levels simultaneously. In other words, these signals are placed into phase with one another in this embodiment. Normally however, and as discussed above, they would be out of phase with one another. Thus, placing them into phase could indicate to the control system that receives these signals that an error has occurred, and it could then take appropriate action, such as, for example, entering an open loop mode, shutting down the machine or components thereof, etc.

The signals could-be placed into phase at block 254 by switching the signals to the same level, and then continually switching them back and forth to the same levels periodically and simultaneously (i.e., without any substantial delay between the switching of one or the other). The signals can be placed into phase as soon as the error is detected. Alternatively, a delay could be introduced to wait for a period of time, or for a number of repetitions of the error condition, to determine if the error persists before placing the signals into phase (in this instance, the error has not occurred until it is verified after a period of time or after a number of repetitions).

Figure 6:
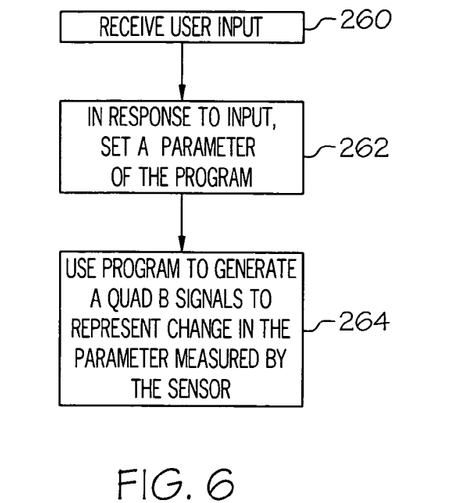
FIG. 6 is a flow diagram showing an illustrative method for setting parameters used by a program that generates quadrature output signals, in accordance with at least one aspect of the present invention.

FIG. 6 shows an illustrative method for setting parameters used by a program that generates quadrature output signals. In this example, the user inputs are received at block 260. These user inputs can be provided by any of a number of user input devices, such as DIP switches, touchscreens, buttons, keys, programming devices and the like. In response to the user input received, a parameter is then set, as shown at block 262. For example, the frequency, resolution, update rate, mode of operation, program/routine to follow, or the like could be indicated based upon the user input. Then, the program is utilized to generate the quadrature signals to represent the change in the parameter measured by the sensor, as shown at block 264. For example, the parameter could comprise the delay time discussed above between switching of the signals.

Figure 7:
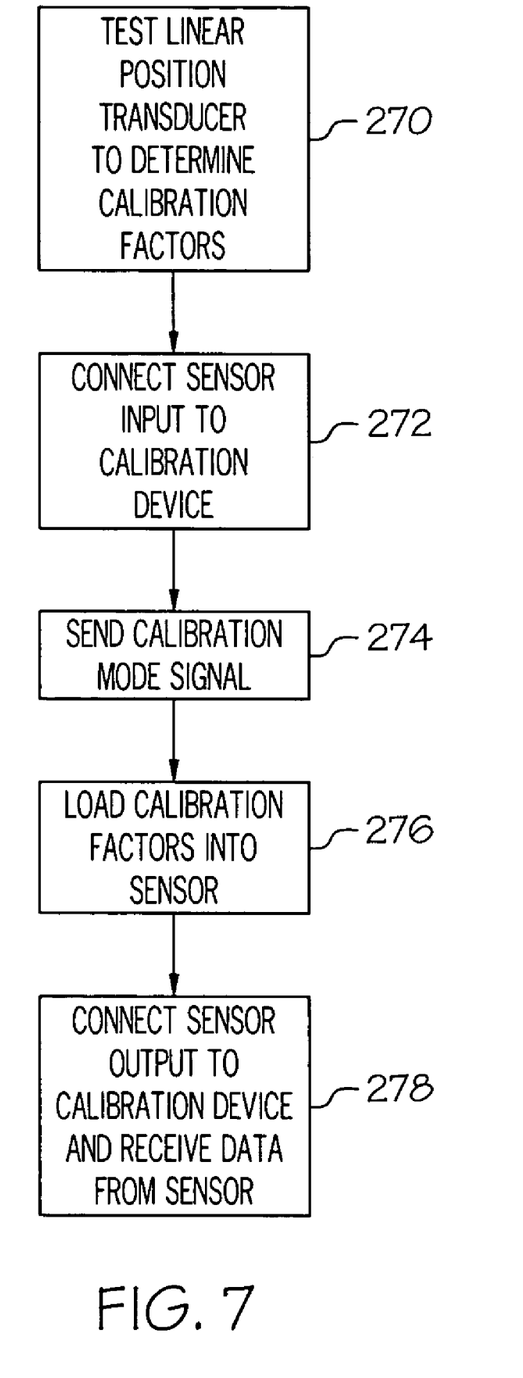
FIG. 7 is a flow diagram showing an illustrative method for loading calibration factor data to a sensor using inputs to the sensor that would normally be used to provide command or control signals to the sensor, according to at least one aspect of the present invention.

FIG. 7 shows an illustrative method for loading calibration factor data to a sensor using inputs to the sensor that would normally be used to provide command or control signals to the sensor. In particular, at block 270 the sensor is tested to determine the calibration factor data that should be utilized. Any of a number of calibration or testing methods can be utilized for determining these factors. For instance, in the case of a linear position sensor, the magnet can be set to various known positions and the output of the sensor measured for each position. The difference between the known and measured position can be used to establish a table or database of compensation factors for each position of the magnet.

At block 272, a calibration device is connected to an input of the sensor that is normally used for another purpose. The calibration device can comprise any suitable programming device, controller, testing device, microprocessor based calibrating unit, or the like. In the example of FIG. 1, this connection of the devices could be achieved by connecting the calibration device to the strobe input 86 (or to pin 116 of FIG. 3). A calibration signal is then provided to the sensor to indicate that it should enter calibration mode, as shown at block 274 of FIG. 7. In the example of FIG. 1, calibration mode could be entered by providing a predetermined signal to the strobe input 86 during a certain timeframe after power up of the sensor. This signal notifies the sensor not to enter the normal mode of operation but rather to prepare to receive calibration factor data. Returning again to FIG. 7, the calibration factor data determined can then be loaded into the sensor via the dual function input, as shown at block 276.

As an alternative, a sensor output could also be connected to the calibration device to download data, parameters, and/or programs from the sensor. For example, with respect to FIG. 1, the calibration device could be connected to the A signal output of line 45' and/or to the B signal output of line 46'. Data, parameters or other similar settings such as pulse frequency, programmed mode, resolution, or any other desired information can then be transferred from the sensor to the calibration device from these outputs. For example, the A signal output could be used to read out the calibration data from the sensor to ensure that it is correct, and the B signal output could be used to read the interrogation and response pulses from the sensor in order to determine the gradient of the waveguide in the sensor. Such a method could apply to other types of sensors as well, such as those that provide analog or digital output signals indicating a measured parameter and having an input for receiving an input signal from a control device. As can be understood from FIG. 7, these outputs and inputs used for other purposes can be used for calibrating, programming and/or testing the sensor. Thus, in this embodiment, specialized outputs or inputs and associated circuitry need not be provided for this purpose, and the sensor need not be opened to access such special outputs and inputs (if such outputs and inputs that are internally housed).

Figure 8:
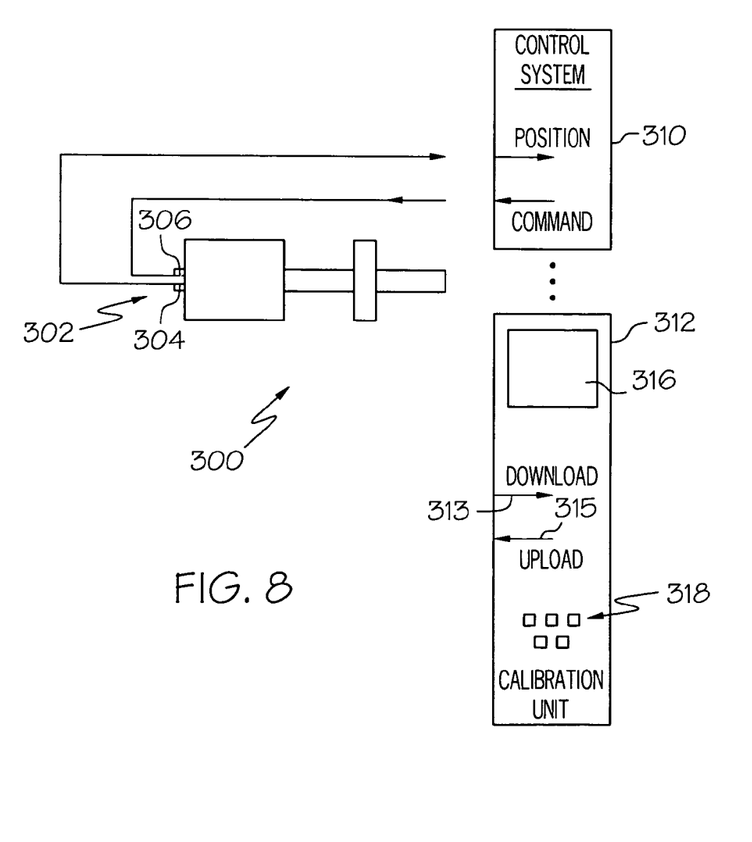
FIG. 8 schematically depicts the ability to connect a calibration unit to the outputs and inputs of a position sensor that are normally used for other purposes, in accordance with at least one aspect of the present invention.

FIG. 8 schematically depicts the ability to connect a calibration unit to the outputs and inputs of a position sensor that are normally used for other purposes, in accordance with at least one aspect of the present invention. According to this example, a position transducer 300 is provided having a connector 302 that provides a position output signal on output 304 and that receives a command input signal on input 306. These outputs and inputs 304 and 306 can be connected to a control system 310 for a machine or process, which can receive the position signal sent from output 304 and which can generate command signals (e.g., requests for position, interrogation signals, etc.) from the control system 310. However, if it is desired to calibrate the transducer 300, the control system 310 can be disconnected from the transducer connector 302, and this same connector, and the same outputs and inputs 304 and 306, can be connected to a calibration unit 312. This unit 312 includes an input 313 and an output 315 which are utilized for calibrating the transducer 300. In particular, the input 313 can connect to the output 304 and can receive or download data, parameters, and other information from the transducer 300. The output 315 can connect to the input 306 and can provide or upload commands, data, calibration factors, program settings and the like to the transducer. For example, the output 315 can be used to provide the command signals to the transducer 300 which cause it to perform calibration operations, such as by providing signals to cause the transducer to enter calibration mode, to output requested data, and to receive and store uploaded data. The unit 312 can also include an output device such as display 316 and an input device such as keys 318. In this embodiment, by using the existing outputs 306 and inputs 304 of the transducer 300 for calibration as well as for normal operation, the transducer need not be provided with a special purpose and separate connector for calibration. Moreover, the housing of the transducer 300 need not be opened to access such a special purpose connector.

As discussed above, the quadrature signals generated by at least some of the sensors described herein can be triggered by a strobe signal transmitted from an external control device in a synchronous mode of operation. Typically, such strobe signals are provided by the control device on a periodic basis. Thus, the sensor will know the approximate time that the next strobe signal will arrive. Accordingly, and in accordance with one aspect of the present invention, the sensor can be programmed such that it will anticipate the next strobe signal and will take a measurement at a time just prior to the receipt of that strobe signal such that it can provide quadrature signals that represent the most recent position of the magnet and thus of the element being measured. In other words, the position measurement can be made just before the next anticipated strobe signal, such that the quadrature signals provided will represent a very recent position measurement.

In particular, the program can cause the next interrogation of the waveguide to be timed such that the return signal from the waveguide will occur just prior to the receipt of the strobe signal from the external control device. The quadrature signals (which are based upon the period of time between the interrogation and the return signal) can then be provided just after the strobe signal is received and will thereby represent a very recent position of the movable element being measured.

Figure 9:
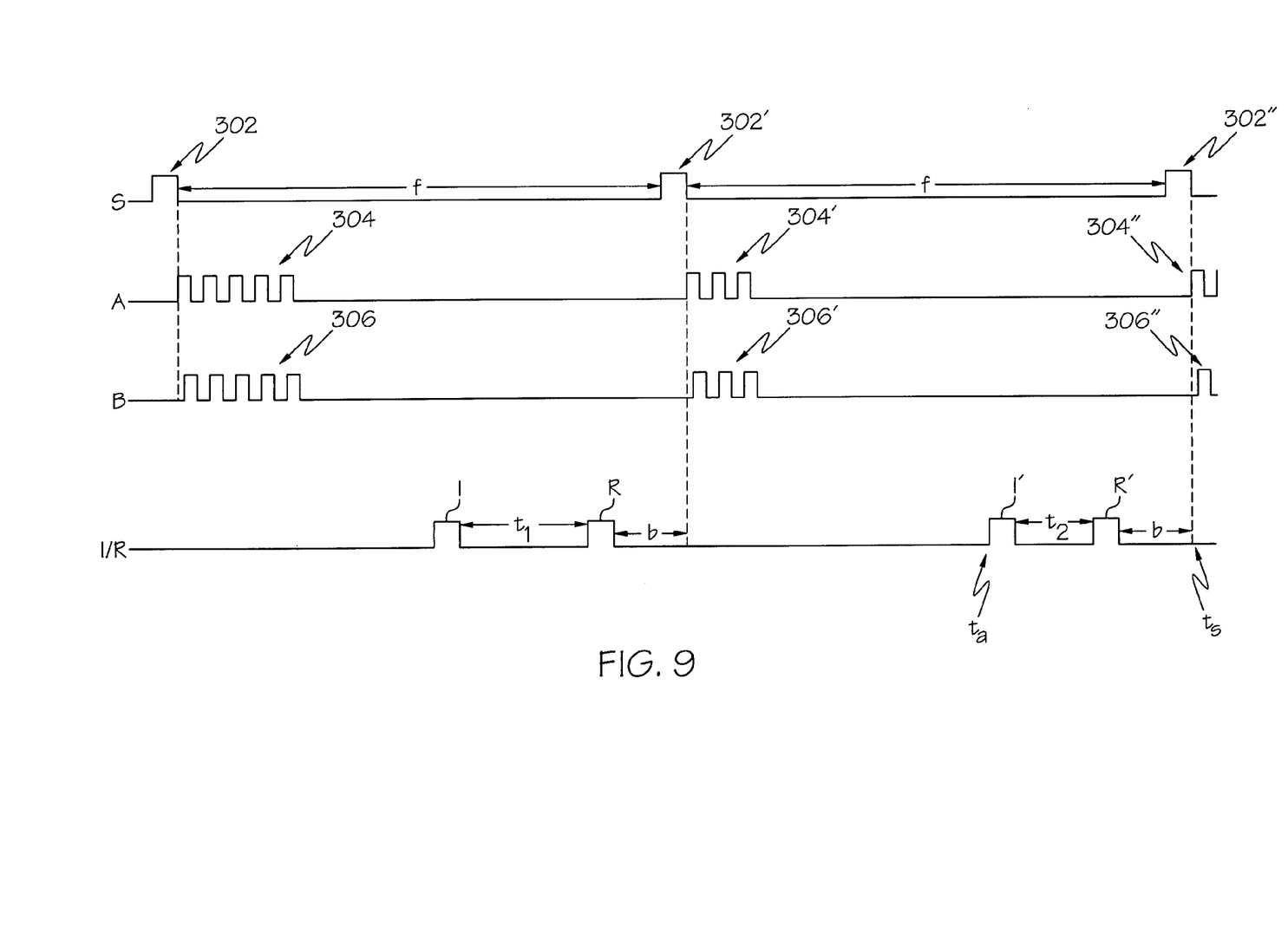
FIG. 9 is an illustrative timing diagram showing the generation of interrogation signals in anticipation of an upcoming strobe signal from an external control device, such that quadrature signals representing a measured parameter can be generated using a very recent measurement, in accordance with one aspect of the present invention.

More specifically, FIG. 9 is an illustrative timing diagram showing the generation of interrogation signals in anticipation of an upcoming strobe signal from an external control device, such that quadrature signals representing the measured parameter can be generated using a very recent measurement. In particular, in one illustrative embodiment, a number of strobe pulses 302 can be provided by an external control system. These pulses 302 indicate to a transducer that the control system would like to receive another incremental signal output (e.g., a quadrature output) from the transducer indicating the change in the measured parameter (e.g., position). Accordingly, as shown in FIG. 9, whenever these strobe signals 302 are provided, quadrature A and B signals are provided in response. These quadrature signals 304 and 306 indicate the change in the measured parameter since the last time the quadrature signals were provided. Thus, as discussed above, each transition of the A signal 304 indicates a predetermined amount of change of the parameter, as does each transition of the B signal 306. The A signal 304 and B signal 306 are out of phase from one another according to whether the change in the measurement was positive or negative, as also discussed above. These signals 304 and 306 can be provided from the transducer in response to, or following, the receipt of the strobe signal 302 at the transducer, such that the transducer is synchronized with the external control device. However, it is also desired that the quadrature signals 304 and 306 are based upon a very recent measurement of the parameter.

Typically, the strobe pulses 302 are provided periodically by the external control system according to a predetermined period or "frame," shown in FIG. 9 as f. Thus, the transducer knows when the next strobe pulse 302 will arrive. Alternatively, and to account for variances or drifting of the signal, the "frame" f of the strobe signal 302 can be continually measured by the transducer such that the transducer knows approximately when the next pulse will arrive. By knowing the approximate frame f, the transducer can then automatically determine an optimal time to produce the next interrogation signal I, which will then interrogate the waveguide and cause a measurement to be taken, such as described above. An ideal time for generating the interrogation signal is one where the return signal R from the waveguide will be received just before the next strobe signal 302 is provided by the control device. Thus, the quadrature signals 304 and 306 will be based upon a very recent measurement, and will indicate the difference between that recent measurement and the previous measurement. Accordingly, as shown in FIG. 9, the interrogation signal I results in a return signal R, and the time t between the two signals represents the absolute value of the measured parameter. This measurement is compared to the previous measurement to create the quadrature signals 304 and 306. Thus, the quadrature signals 304" and 306" would be based upon the difference between $t_2$ and $t_1$, each transition of the quadrature signals representing a portion of that difference. Because the measurement $t_2$ is taken relatively close in time to the next strobe signal 302", the quadrature signals 304" and 306" thereby represent a very recent measurement.

More specifically, by knowing the frame f, and the last measurement taken $t_1$, the transducer can predict when to provide the interrogation I' such that the response pulse R' will occur in advance of the next strobe signal 302" by approximately a predetermined buffer time b. In this embodiment, the buffer time b provides some cushion time for any processing needed in advance of the generation of the quadrature signals 304" and 306". For example, the buffer time b can be used to compensate the measurement and/or to calculate the number of quadrature signal transitions needed. The buffer time b can also be set to provide extra allowance in case the measurement has changed dramatically or in the event of other variances. The buffer time b can also be set according to the maximum expected/allowed rate of change of the measured parameter. Although many variations are possible, in one illustrative embodiment, the frame f could be between about 500 microseconds and 10 milliseconds and the buffer b could be approximately 100 microseconds.

More specifically, according to principles of the present invention, knowing the previous measurement $t_1$, the frame f and the buffer time b, the transducer can calculate an anticipation time $t_a$ at which the interrogation signal I' should be generated. In particular, from the frame f the transducer knows the approximate time $t_s$ that the next strobe signal 302" will occur. It can thus subtract from $t_s$ the predetermined desired buffer time b as well as the last measurement $t_1$, with the expectation that the next measurement will not vary significantly from $t_1$. The resulting difference indicates the time $t_a$ at which the interrogation signal I' should be generated. Alternatively, rather than subtracting $t_1$, another value based upon $t_1$ could be subtracted, such as a predicted measurement based upon $t_1$ as well as the most recent change in the measured parameter ($t_1$ minus $t_0$).

Figure 10:
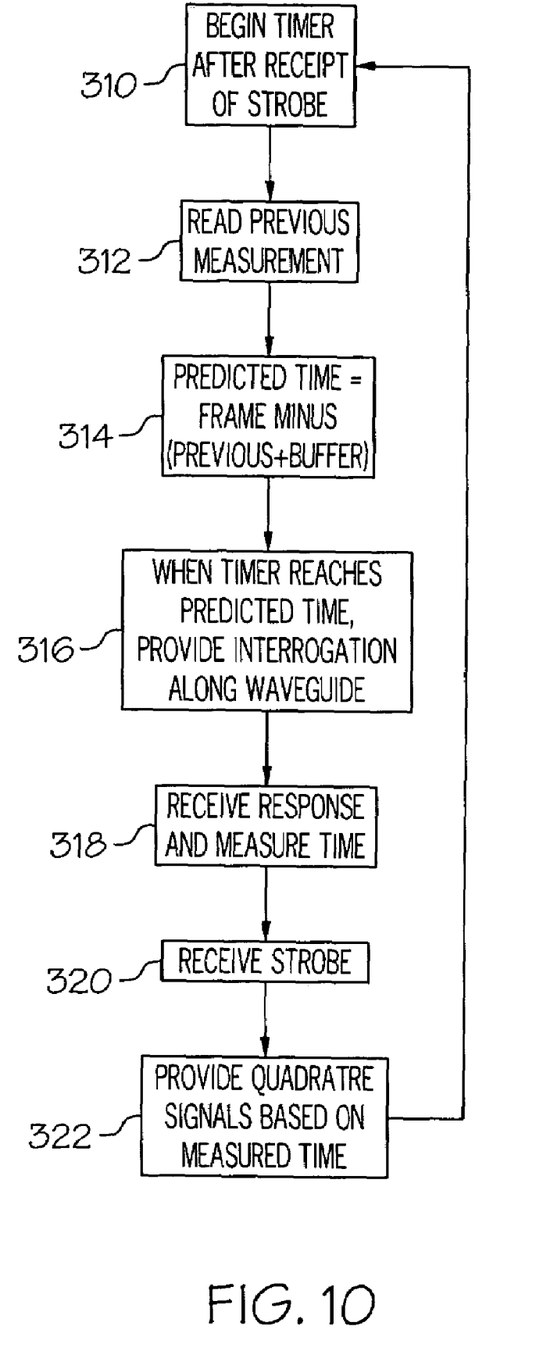
FIG. 10 is a flow diagram depicting an illustrative method for generating interrogation signals in anticipation of an upcoming strobe signal from an external control device and generating quadrature signals following the strobe signal, such as to create the signals shown in FIG. 9.

FIG. 10 is a flow diagram depicting a illustrative method for generating interrogation signals in anticipation of an upcoming strobe signal from an external control device, and generating quadrature signals following the strobe signal, such as to create the signals shown in FIG. 9. In particular, at block 310, a timer is started following the receipt of a strobe pulse. The previous measurement is then obtained, as shown at block 312. A predicted or anticipated time is then calculated at block 314 by adding the predetermined buffer time to the previous measurement time and subtracting the sum from the frame time. As mentioned above, the buffer time is the amount of time prior to the next strobe signal that it is desired to receive the response pulse, to allow for processing, variances, etc. As also mentioned above, the frame time is the time, either measured or predetermined, between strobe pulses. Moreover, rather than using the raw value of the previous measurement time, another value can be calculated and used that is based upon the previous measurement time. For example, a predicted measurement time could be used that is based upon the rate of change determined from two or more previous measurements.

At block 316, when the timer reaches the predicted time, then an interrogation signal can be provided along the waveguide. The interrogation signal can be provided in any suitable manner, such as using the methods and devices described earlier for example. At block 318, a response pulse will be received from the waveguide. The time between the interrogation and the response represents the measured parameter, as discussed earlier. A strobe signal is then received, as shown at block 320. In response to that strobe signal, quadrature output signals are provided as shown at block 322. These quadrature output signals are based upon the time measured at block 318. In particular, in one embodiment, and as discussed above, the measurement can be compared to a previous time measurement to determined an amount of change, and the number of transitions in the quadrature signals can be made to be proportional to that amount of change. The process then returns to block 310. Accordingly, because the interrogation is provided at block 316 at an optimal time, the time measurement at block 318 represents a recent position of the measured element, and the quadrature signals provided at block 322 are not outdated or "stale."

As can be understood, the illustrative method shown in FIG. 10 can be carried out by one or more controllers, circuits, or processors in combination with a program, instructions, or logic, such as, for example, by the controllers or circuits described above. As also can be understood, other variations to the method of FIG. 10 are possible. For instance, the frame time can be measured periodically and compared to a previous frame time. If the change in the frame time exceeds some predetermined value, an alarm can be indicated, or the transducer can cease producing outputs until the frame time ceases changing so rapidly. For instance, the transducer could indicate an error or can cease producing outputs if the change in the frame time exceeds 200 nanoseconds. The transducer could resume normal operation if the change in the frame time does not exceed 200 nanoseconds for a predetermined number of frames (e.g., six frames).

Accordingly, while a number of exemplary and alternate embodiments, aspects, methods, systems, configurations, and potential applications have been described, it should be understood that many variations and alternatives could be utilized without departing from the scope of a given claim. For example, while some aspects have been described in the context of a position sensor, these aspects can apply to many other types of sensors, counting devices, or other incremental output devices as well. Moreover, while separate hardware devices have been shown in illustrative embodiments, such devices could be combinable if desirable or appropriate. Furthermore, while various aspects of the invention have been described, these aspects need not necessarily be utilized in combination. Thus, it should be understood that the embodiments and examples have been chosen and described only to best illustrate the various principals of the invention and their practical applications to thereby enable one of ordinary skill in the art to best utilize them in various embodiments and with various modifications as are suited for particular uses contemplated. Consequently, it is intended that the scope of the each aspect of the invention be defined by the claims relating thereto, and that these claims are not to be limited by details of the examples described above.

What is claimed is:

1. A method in a sensor for generating incremental output signals indicating the change in a parameter, the method comprising:
    providing a signal representing a value of the parameter;
    using a program to determine a number of transitions to provide based upon the change in the value of the parameter; and
    using the program to switch at least one incremental output signal based upon the number of transitions determined, such that the number of transitions in the incremental output signal represents the change in parameter.

2. The method as recited in claim 1, wherein the at least one incremental output signal comprises a pair of square wave signals approximately ninety degrees out of phase from one another.

3. The method as recited in claim 1, wherein the sensor comprises a linear position transducer and the signal comprises a position signal.

4. A storage medium having stored executable instructions for performing a method for generating quadrature output signals indicating the change in a measured parameter, the method comprising:
    determining a transition count based upon the change in the measured parameter;
    determining the direction of the change in the parameter; and
    generating a pair of quadrature pulse signals such that the number of transitions in the quadrature pulse signals is substantially equal to the transition count, and such that the phase of the pulse signals is offset based upon the direction determined whereby the pulse signals represent the change in the measured parameter, wherein the stored instructions cause the generation of the quadrature pulse signals.

5. The medium as recited in claim 4, wherein the generating operation comprises:
    if the change in the measured parameter is negative, generating the pulse signals such that one of the signals having a designation of A lags in phase the other pulse signal having a designation of B; and
    if the change in the measured parameter is positive, generating the pulse signals such that one of the signals having a designation of A leads in phase the other pulse signal having a designation of B.

6. The medium as recited in claim 4, wherein the generating operation comprises:
    determining the number of transitions needed to place the pulse signals at a predetermined state;
    switching the pulse signals to reach that state;
    switching the pulse signals in a loop a number of times based upon the transition count; and
    switching the pulse signals any remaining times needed.

7. The medium as recited in claim 4, wherein the method further comprises:
    providing a predetermined output signal whenever a predetermined value of the measured parameter is reached, wherein the predetermined value is user definable via a user input.

8. A method for providing output signals in a quadrature output device, the method comprising:
    providing a measurement signal indicating a value of a measured parameter;
    generating a pair of signals having a number of transitions, wherein the number of transitions in the signals is proportional to the change in measurement signal;
    detecting whether an error has occurred;
    if an error has occurred, causing a simultaneous transition of the pair of signals; and
    if an error has not occurred, maintaining a timing offset in the transitioning of the signals.

9. The method as recited in claim 8, wherein the pair of signals comprises square waves which are approximately ninety degrees out of phase from one another, but are in phase during the causing operation.

10. A method for providing output signals from a sensor, the method comprising:
    receiving at least one input from a user indicating a user selection;
    modifying a program setting based upon the user selection;
    providing a measurement signal indicating a value of a measured parameter;
    determining the value of the measured parameter; and
    using the program, generating a pair of signals having a number of transitions, the number of transitions in the signals representing the value of the measured parameter.

11. The method as recited in claim 10, wherein the pair of signals comprise square waves which are approximately ninety degrees out of phase from one another, and wherein the number of transitions in the signals is directly proportional to the change in the measured parameter.

12. The method as recited in claim 10, wherein the program setting comprises at least one of the frequency of the signals, the number of transitions of the signals per unit of measured parameter, and the frequency of the generation operation.

13. A method for calibrating a sensor, the method comprising:
    testing the sensor to determine calibration factor data, wherein the sensor includes at least one input that is normally used to receive a command signal from an external control device;
    connecting a calibration device to the at least one sensor input that is normally used to receive a command signal from an external control device; and
    loading calibration factor data from the calibration device over the at least one sensor input that is normally used to receive a command signal from an external control device;
    wherein the sensor comprises a quadrature output sensor.

14. The method as recited in claim 13, further comprising:
    connecting the calibration device to at least one sensor output that is normally used to provide a measurement signal from the sensor; and
    transferring parameters from the sensor to the calibration device using the at least one output.

* * * * *